Sept. 1, 1964
M. R. OSWALD ETAL  3,147,321
METHOD FOR PRE-EXPANDING ELONGATED SEGMENTS OF STRANDS
OF EXPANDABLE STYRENE POLYMER COMPOSITIONS
Filed March 13, 1961
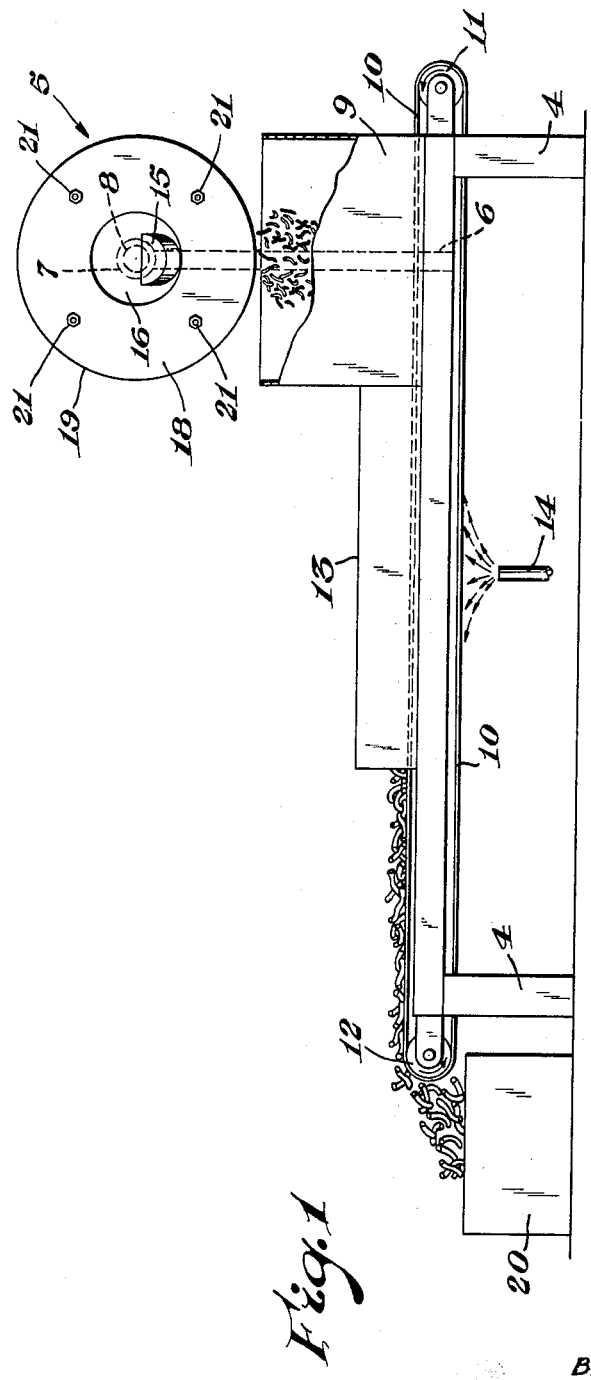
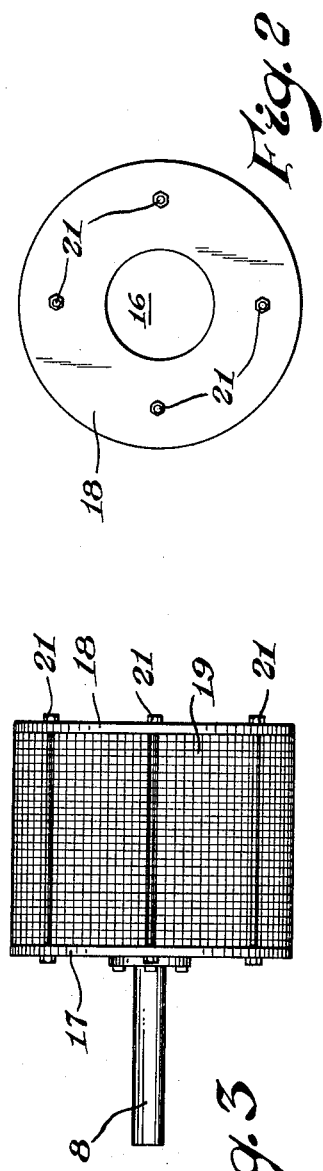
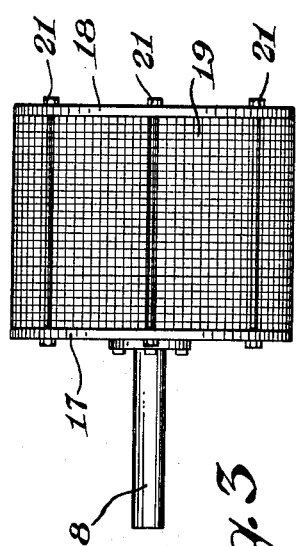
INVENTORS.
Max R. Oswald
Roy L. Kinsey
BY
Griswold & Burdick
ATTORNEYS 3,147,321
METHOD FOR PRE-EXPANDING ELONGATED SEGMENTS OF STRANDS OF EXPANDABLE STYRENE POLYMER COMPOSITIONS
Max R. Oswald and Roy L. Kinsey, Midland, Mich., assignors to The Dow Chemical Company, Midland, Mich., a corporation of Delaware
Filed Mar. 13, 1961, Ser. No. 95,170
5 Claims. (Cl. 264—53)

This invention relates to a method for foaming segments of expansible styrene polymer compositions. It relates more particularly to a method for feeding, heating and foaming elongated curved, bent, twisted and curled segments of expansible styrene polymer compositions to obtain cellular segments, which, when poured into a container form a tangled resilient mass, and are suitable for use as a packaging material, e.g. for packaging articles subject to damage by impact or shock.

It is known to foam expansible styrene polymer compositions, e.g. solid granules of polystyrene containing a volatile organic liquid such as pentane, hexane, petroleum ether, and the like, boiling below the softening point of the polymer, as the foaming agent, by heating granules of the polymer in any usual way such as with hot water, steam, or infrared lamps. Molded cellular articles are readily prepared from granules of foamable styrene polymer compositions by placing a quantity of the expansible material in a porus mold which permits the escape of gases, usually in an amount corresponding to twenty percent or less of the volume of the mold cavity, then heating the granules in the closed mold, whereby they expand and press against walls of the mold and against one another with resultant bonding or flowing together to form a cellular article having the shape of the mold cavity. In preparing molded articles from particles of expansible styrene polymer compositions it is common practice to prefoam or partially foam up the styrene polymer granules, then to fill or substantially fill a mold cavity with a quantity of the prefoamed granules which are capable of still further foaming up and heat the granules to cause expansion thereof in the closed mold with a resultant flowing together and bonding of the granules with one another to form a cellular article conforming to the shape of the mold cavity. Such procedure, in general, makes molded articles of somewhat better uniformity of foam density throughout a molded article, and of better form. The prefoaming or partially foaming up of small particles, granules or beads of the foamable styrene polymer compositions presents no difficult problems since small particles or beads of the granular material can readily be fed to a heating zone wherein it is partially foamed up and is easily removed from said zone.

However, in the foaming of individual elongated segments of strands of expansible styrene polymer compositions to produce curved, bent, twisted and curled pieces of cellular foam having a substantially continuous outer skin, and, which when poured into a cavity, form a tangled, intertwined, resilient, mass of the foamed segments, suitable as a packing material to prevent damage to articles packaged therein, the methods and apparatus heretofore employed for the foaming of small granules or beads of the styrene polymer compositions have not been satisfactory for the reason that elongated segments or strands of the foamable styrene polymer compositions, which segments may have a length to cross-sectional dimensional ratio as high as 200:1 and which are individually often of curved, bent, twisted and curled form, have a tendency to tangle and intertwine into masses which render it difficult to provide a uniform feed of the expansible segments to a heating zone wherein they can be individually foamed to produce a desired packing material.

Accordingly, it is a primary object of the invention to provide a method for individually foaming elongated segments of strands of expansible styrene polymer compositions. Another object is to provide a method for foaming curved, bent, twisted and curled elongated segments of strands of styrene polymer compositions to produce foamed pieces of said segments capable of forming, when poured into a cavity, a tangled, intertwined, resilient, mass suitable as a packing material for preventing damage to objects positioned therein and subject to damage by shock or impact. A specific object is to utilize in combination an apparatus having means for uniformly feeding elongated segments of strands of an expansible styrene polymer composition into a heating zone wherein the segments are heated and individually foamed to produce curved, bent, twisted and curled pieces, then are removed from the heating zone in continuous manner. A further object is to utilize an apparatus for foaming granules and segments of expansible styrene polymer compositions in continuous manner. Other and related objects may appear from the following description of the invention.

According to the invention the foregoing and related objects are obtained by supplying granules or elongated segments, including curved, bent, twisted and curled segments of strands, rods, tapes, ribbons, bars or angles, of a normally solid expansible styrene polymer, containing a volatile organic fluid foaming agent boiling below the heat distortion temperature of the polymer, uniformly distributed throughout, and which elongated segments preferably each have a cross-sectional area equivalent to the area of a circle having a diameter of from 0.01 to 0.2 inch and a ratio of length to cross-sectional area within the range of from about 8:1 to about 200:1, to a rotatable screen feeder, tumbling the granules or elongated segments on a screen having a mesh size sufficient to retain the segments of the expansible styrene polymer thereon when the screen is at rest, but of mesh size sufficient to allow individual segments to pass therethrough when the segments are tumbled on the screen by rotating the feeder. In general, the smallest dimension of the mesh of the screen is greater than the largest cross-section dimension of the elongated segments, but not more than one-half the length of said segments, and the largest dimension of said screen being less than the length of said elongated segments, sufficient to allow passage of individual granules or segments of said expansible styrene polymer segments therethrough, although mesh of other sizes and dimensions are operable in the process, e.g. mesh of sizes of ½ x ½ inch square or of ¾ inch hexagons can be used for segments of 0.02 diameter by 3 to 4 inches long. The segments passing through the screen of said feeder are collected on a continuous screen belt which transports said segments into and through a heating zone wherein they are heated to temperatures above the softening point of the styrene polymer and above the boiling point of the volatile organic fluid foaming agent contained therein, with resultant individual expansion of the granules or elongated segments to curved, bent, twisted and curled cellular pieces having a substantially continuous outer skin covering a body of interior individually-closed, thin-walled cells, and removing the expanded segments from the screen belt.

The apparatus utilized comprises in combination, a frame, a rotatable screen feeder positioned on a shaft pivotally mounted on said frame, means for rotating said screen feeder, a hopper mounted on said frame beneath said screen feeder, a continuous screen belt mounted on said frame beneath said hopper, means for driving said screen belt, a housing mounted on said frame surrounding at least a top portion of said continuous screen belt, means for contacting the screen belt within said housing and material thereupon, with a heated non-solvent fluid and means for removing the foamed material from said screen belt after heating and foaming said material within said housing.

The invention is described more particularly with reference to the accompanying drawings wherein:

FIG. 1 is a schematic drawing of an isometric view of an assembly of an arrangement of elements suitable for practice of the invention.

FIG. 2 is a face view of the screen drum feeder, and

FIG. 3 is a side view of the screen drum feeder.

In the drawing the numeral 4 indicates a frame with supporting legs. A feeder 5 is mounted on the frame 4 through support 6 to which is pivotally attached a bearing 7 enclosing shaft 8 in fixed attachment to the back side of feeder 5. A hopper 9 is mounted on the frame 4, beneath the feeder 5 with running clearance for screen belt 10 to pass thereunder, thence along the top side of frame 4 around the rollers 11 and 12. A housing 13 is mounted on frame 4 adjacent to hopper 9 to enclose a portion of screen belt 10. A nozzle 14 is positioned below the upper side of screen belt 10 and beneath housing 13 to direct a heated non-solvent fluid through the screen belt 10 and into contact with material thereon to heat the same.

A vent stack (not shown) may be attached to the housing 13, if desired. The feeder 5 and continuous screen belt 10 are driven by any usual means such as electric motors, preferably each with a variable type drive (not shown). Material may be supplied to the feeder 5, via a trough 15 leading into inlet opening 16 in the face of the feeder. The foamed segments are discharged from belt 10 and collected in a container 20.

FIG. 2 of the drawing is self explanatory and shows the face of the feeder 5 having the inlet opening 16 therein and spacer bolts 21. Said spacer bolts 20 are preferably spaced away from the screen 19 so as to provide a lifting action for tumbling the segments as the feeder 5 is rotated.

FIG. 3 of the drawing is a side view of the feeder 5 showing the shaft 8 in fixed attachment to back plate 17 of feeder 5 and face plate 18, said face plate 18 and back plate 17 being held in spaced apart relationship by means of spacer bolts 21. The screen 19 is secured in fixed peripheral attachment to the face and back plates 18 and 17. The mesh of screen 19 can be of any configuration such as round, hexagonal, octagonal, square or rectangular and is of a mesh size the smallest dimension of which is greater than the greatest cross-section dimension of the elongated segments or granules, but not more than one-half the length of the expansible styrene polymer segments supplied to said feeder, and the greatest dimension of the screen mesh being less than the length of said segments or granules, sufficient to allow the passage of individual segments or granules of the expansible styrene polymer therethrough as the screen feeder is rotated.

In practice of the invention employing an arrangement of elements in an assembly similar to that shown in the drawing, a supply of elongated segments of an expansible styrene polymer composition which are generally in curved, bent, twisted and curled form and of cross sectional dimension between about 0.01 and 0.2, preferably from 0.02 to 0.1 inch and correspondingly have a length to cross-sectional area ratio of from about 8:1 to 200:1, is placed in the feeder 5 either by feeding the same directly into the inlet 16 or via trough 15. It may be mentioned that best results are obtained when using elongated strands of the expansible styrene polymer compositions between about 2 and about 20, preferably between about 2 and about 8 inches in length and correspondingly a diameter or cross section of from about 0.01 to 0.1 inch. The feeder 5 is rotated at speeds that can vary from about one revolution or less per minute up to 30 revolutions per minute, preferably at rates of from about 5 to 20 revolutions per minute, to tumble, separate from one another and allow individual segments to pass through the mesh of screen 19. The segments passing through the mesh of screen 19 of feeder 5, are directed by hopper 9 onto continuous screen belt 10 which may be of any mesh size suitable to retain the segments thereon, e.g. of from about 10 to 50 mesh per inch as compared to U.S. Standard screens. Alternatively, a perforated stainless steel belt can be used, e.g. a belt of stainless steel having a plurality of drill holes of sizes between about 1/64 and 1/8 inch therein. The moving belt transports the separated segments into housing 13 wherein the expansible styrene polymer segments are contacted with a heated non-solvent fluid such as gas, air, or steam, preferably the latter, and are heated to temperatures above the softening point of the polymer and above the boiling point of the volatile organic fluid foaming agent contained therein, sufficient to foam the individual segments to cellular pieces. The time for which the heating is continued can readily be regulated by controlling the rate of linear travel of the belt 10 and is usually of the order of from about three to thirty minutes, but longer or shorter heating times can be used. The temperatures employed preferably are within the range of from about 90° to 110° C. After expanding the elongated segments, they are removed from belt 10 in any usual way, suitably by free fall beyond the turn of the belt and are collected in a suitable container 20.

The thermoplastic styrene polymers useful in practice of the invention to produce the granular or elongated and curved, bent, twisted and curled individually foamed segments are the resinous styrene polymers containing in chemically combined, i.e. polymerized, form a predominant amount by weight of at least one alkenyl aromatic compound having the general formula:

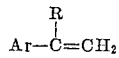

wherein Ar represents an aromatic hydrocarbon or a nuclear halohydrocarbon radical of the benzene series and R is hydrogen or the methyl radical, and containing uniformly distributed throughout a volatile organic fluid foaming agent boiling at a temperature below the heat distortion temperature of the styrene polymer. The heat distortion temperature is determined by a procedure of Heirholzer and Boyer, ASTM Bull. No. 145 of May 1945.

Examples of suitable styrene polymers are the normally solid homopolymers and copolymers of one or more styrene compounds such as styrene, vinyltoluene, vinylxylene, isopropylstyrene, ethylvinylbenzene, ar-chlorostyrene, ar-dichlorostyrene, ar-bromostyrene, ar-fluorostyrene, p-tert-butylstyrene, mixtures of any two or more of such monovinyl aromatic compounds, or mixtures of any one or more of said monovinyl aromatic compounds and from 0.01 to 0.5 percent by weight of a polyvinyl aromatic hydrocarbon such as divinylxylene, and the like, or copolymers of a predominant amount by weight of one or more of such monovinyl aromatic compounds and a minor proportion of one or more compounds such as methyl methacrylate, vinyl acetate, or acrylonitrile.

The volatile organic fluid foaming agent to be empolyed in preparing the expansible styrene polymer compositions can be a gas or a liquid at ordinary temperatures and pressures, i.e. at atmospheric conditions. The foaming agent should be a poor solvent for the copolymer and should have a boiling point not substantially above the heat distortion temperature of the copolymer, i.e. it should have a boiling point of 95° C. or lower at atmospheric pressure. It should be soluble in the monomers from which the copolymers are prepared and should be soluble in, but should not dissolve or swell appreciably the solid copolymer. The foaming agent should have a molecular weight of at least 58 or greater, and have a molecular size such that it does not readily diffuse through interstices between the copolymer molecules at ordinary temperatures and pressures, e.g. at room temperature or thereabout and atmospheric pressure.

Examples of fluid compounds which are suitable foaming agents are saturated aliphatic hydrocarbons such as butane, isobutane, pentane, isopentane, neopentane, hexane and heptane, saturated aliphatic and cyclic perchlorofluorocarbons such as

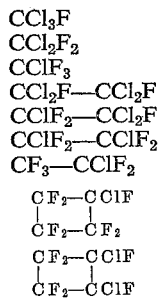

and tetraalkyl silanes such as tetra-methylsilane, trimethylethylsilane, tri-methylisopropysilane or trimethyl n-propyl silane. Mixtures of any two or more of such volatile foaming agents can be used. The volatile fluid compound is usually employed in amounts corresponding to from about 0.05 to 0.4 gram mole of the volatile compound per 100 grams of the polymer so as to provide a sufficient volume of vapors of said volatile agent to substantially expand the copolymer upon heating the same to its softening point or above.

The expansible styrene polymer compositions comprising the solid styrene polymer having the volatile organic fluid foaming agent uniformly dispersed throughout can readily be prepared in known ways, e.g. by intimately blending together in a plastics extruder under pressure the heat-plastified or molten styrene polymer and the volatile organic fluid foaming agent, such as pentane, petroleum ether, dichlorodifluoromethane, dichlorotetrafluoroethane or a mixture of such volatile compounds in the desired proportions to form a homogeneous flowable gel, bringing the gel to a temperature between about 60° and 120° C. and extruding the gel into a zone of lower pressure such as the atmosphere as one or a plurality of fine strands, rods, bars, ribbons, tapes and the like which are quickly cooled to a solid condition prior to any appreciable expansion of the extruded material, and are thereafter cut or broken into segments of a desired length. The segments of the strands, rods, bars, etc., of the expansible styrene polymer composition are preferably annealed by reheating the same to temperatures between about 50° and 85° C. with hot water for a period of from about 30 to 360 seconds or longer, sufficient to relieve the orientation in the segments which orientation usually occurs during the extrusion and cooling operation. The annealing step usually results in some curling, bending, curving and twisting of the non-foamed elongated segments, which is an advantageous and necessary feature in the final foamed product for use as a packing material.

The following example illustrates a way in which the principle of the invention has been applied, but is not to be construed to be as limiting the invention.

*Example*

Employing an assembly of elements in an arrangement similar to that shown in FIG. 1 of the drawing wherein the screen feeder 5 comprised a drum 18 inches in diameter by 14 inches wide having a peripheral screen 12 inches wide with mesh opening of ½ x ½ inch and the continuous belt 10 was 12 inches wide by about 6 feet long (double length) and was made of wire screen of 30 mesh per inch U.S. Standard screen. The housing 13 was an open chamber or hood about 4 feet long over a portion of belt 10.

In the experiment the feeder 5 was supplied with a charge of elongated segments of an expansible polystyrene consisting of polystyrene having a viscosity characteristic corresponding to about 23 centipoises as determined for a 10 weight percent solution of the polystyrene in toluene at 25° C., and containing about 6.5 percent by weight of normal pentane as foaming agent. The elongated segments were of somewhat curved, bent, twisted and curled form and were pieces of strands having a cross-section diameter of 0.03 inch and a linear length of from 3 to 4 inches. The feeder 5 was rotated at a speed of six revolutions per hour which resulted in a feed rate corresponding to 10 pounds per hour of the individual segments passing through the mesh of the screen of the feeder per hour. The segments were allowed to fall upon the continuously moving belt 10 and were transported into and through housing 13 at a linear rate of about 1.6 feet per minute. The residence time in the heating zone within housing 13 was about 2.5 minutes. During passage of the segments on the screen belt 10 through the heating zone within housing 13, steam was withdrawn from a 40 p.s.i. gauge pressure supply and was fed beneath the upper portion of the screen belt 10 and into contact with the elongated segments thereon at a rate sufficient to heat the segments to temperatures between about 95° and 100° C. whereby the segments were foamed to cellular pieces, which during the foaming up were further curled, bent, twisted and curled, to form foamed pieces having a cross-section diameter of about 0.25 inch and linear lengths of from about 3 to 4 inches. The foamed pieces were removed from the belt 10 and collected in a container 20. The absolute density of the foamed pieces was 2 pounds per cubic foot of the foam.

Similar results are obtained when other expansible styrene polymers such as copolymers of styrene and acrylonitrile, copolymers of styrene and methyl methacrylate, copolymers of styrene and vinyl acetate, copolymers of styrene and vinyltoluene, or polyvinyltoluene are substituted for the polystyrene employed in the example.

We claim:

1. A process which comprises individually foaming elongated segments of strands, including curved, bent, twisted and curled segments of strands, ribbons, bands, tapes, and rods of a normally solid expansible styrene polymer compositon containing a volatile organic fluid foaming agent, boiling at temperatures below the heat distortion temperature of the styrene polymer, uniformly distributed throughout, said elongated segments each having a cross-sectional area equivalent to the area of a circle having a diameter of from 0.01 to 0.2 inch and a ratio of length to cross-sectional area within the range of from about 8:1 to about 200:1, by supplying said elongated segments to a rotating feeder, tumbling the elongated segments on a screen having a mesh size the smallest dimension of which is greater than the largest cross-section dimension, but not more than one-half the length, of said elongated segments, and the largest dimension of said screen mesh being less than the length of said segments, sufficient to allow passage of individual segments of said expansible styrene polymer composition therethrough, continuously collecting the segments passing through the screen of the rotating feeder on a porous belt which retains the segments thereon, transporting said segments into a heating zone and foaming the expansible styrene polymer composition segments by heating the same to a temperature between 90° and 110° C. by contacting said expansible segments in said heating zone with a heated nonsolvent fluid, and removing the foamed segments from said heating zone.

2. A process according to claim 1, wherein the expansible styrene polymer composition is polystyrene.

3. A process according to claim 1, wherein the expansible styrene polymer composition is foamed by heating the elongated segments with steam.

4. A process according to claim 1, wherein the expansible styrene polymer composition contains a volatile aliphatic hydrocarbon as the foaming agent.

5. A process which comprises individually foaming elongated curved, bent, twisted and curled segments of strands of a normally solid expansible styrene polymer composition containing a volatile fluid organic foaming agent, selected from the group consisting of saturated aliphatic hydrocarbons containing from 4 to 7 carbon atoms, having a molecular weight of at least 58 and boiling at a temperature below 95° C. at 760 millimeters absolute pressure, dissolved in the solid styrene polymer, said elongated segments each having a cross-sectional area equivalent to the area of a circle having a diameter of from 0.01 to 0.2 inch and a ratio of length to cross-sectional area within the range of from about 8 to 1 to about 200 to 1, by supplying said elongated segments to a rotating feeder, tumbling the elongated segments on a screen having a mesh size the smallest dimension of which is greater than the largest cross-section dimension, but not more than one-half the length of said elongated segments, and the largest dimension of said screen mesh being less than the length of said segments, sufficient to allow passage of individual segments of the strands of said expansible styrene polymer composition therethrough, continuously collecting the segments passing through the mesh of the screen of the rotating feeder on a screen belt, transporting said segments on said screen belt into a heating chamber, foaming the expansible styrene polymer segments by heating the same to a temperature between 90° and 110° C. by contacting the elongated segments with steam in said heating chamber and removing the foamed segments from said heating chamber.

References Cited in the file of this patent
UNITED STATES PATENTS

| | | |
|---|---|---|
| 1,201,131 | Althouse | Oct. 10, 1916 |
| 1,304,182 | Hollister | May 20, 1919 |
| 2,389,650 | Stephens | Nov. 27, 1945 |
| 2,576,977 | Stober | Dec. 4, 1951 |
| 2,595,964 | Lovell | May 6, 1952 |
| 2,832,509 | Emanatian | Apr. 29, 1958 |
| 2,848,428 | Rubens | Aug. 19, 1958 |
| 2,907,072 | Jodell | Oct. 6, 1959 |
| 3,015,479 | Edberg et al. | Jan. 2, 1962 |
| 3,026,272 | Rubens et al. | Mar. 20, 1962 |
| 3,059,251 | Pollock | Oct. 23, 1962 |

OTHER REFERENCES

BASF booklet, "New Methods for the Fabrication of Styropor," pp. 4–5. Reprinted from "Der Plastverbeiter" 7, 242–250 (1955).